April 1, 1924.
H. E. MOFFAT
WATER HEATER AND PURIFIER
Filed Oct. 31, 1921
1,488,697
2 Sheets-Sheet 2
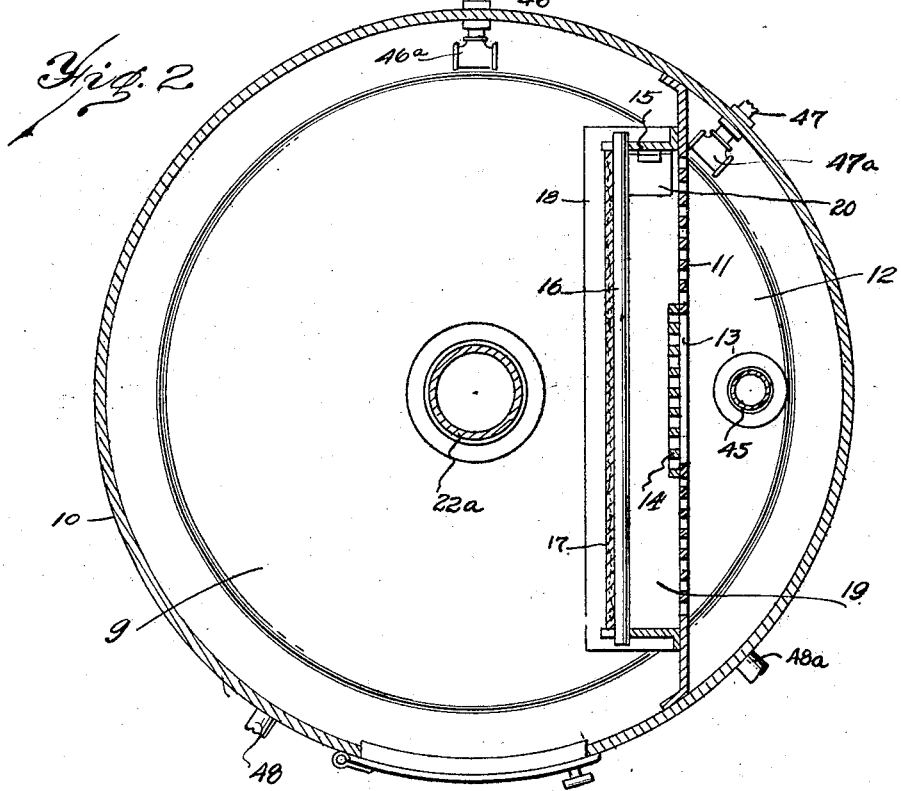
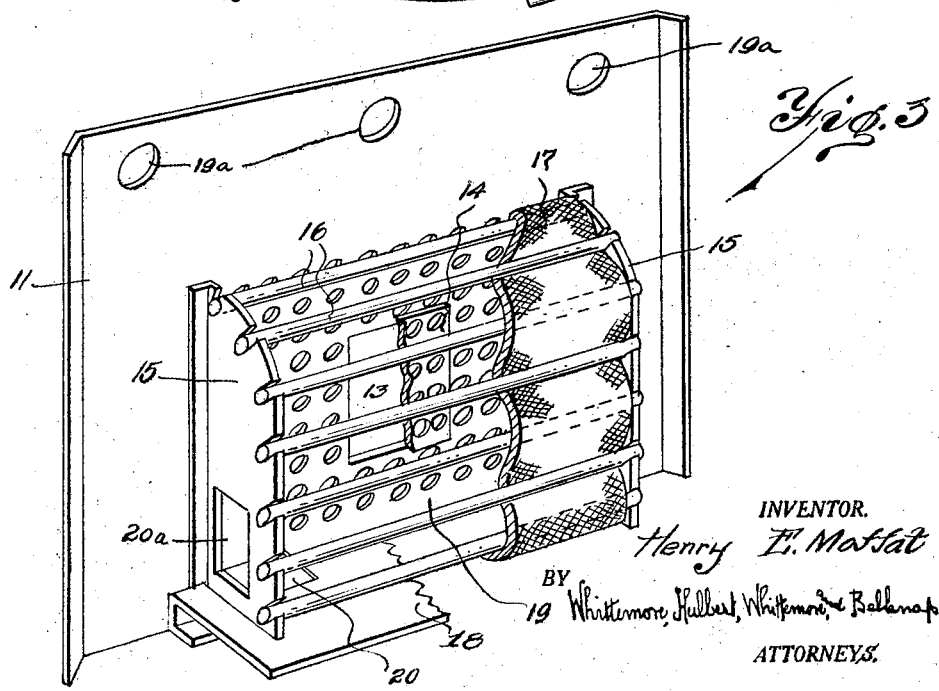
INVENTOR.
Henry E. Moffat
BY Whittemore, Hulbert, Whittemore & Belknap
ATTORNEYS.

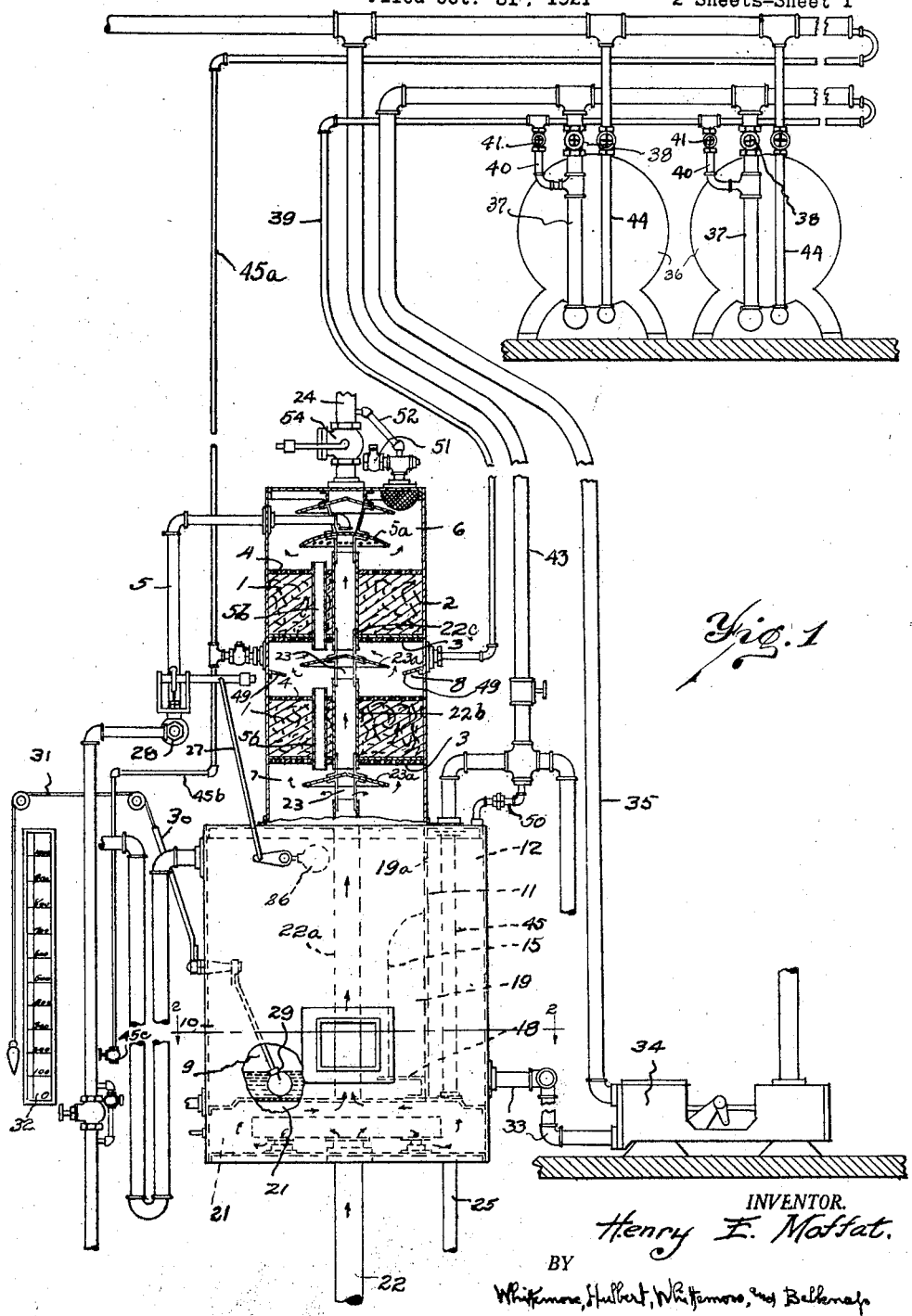

Patented Apr. 1, 1924.

1,488,697

UNITED STATES PATENT OFFICE.

HENRY E. MOFFAT, OF HIGHLAND PARK, MICHIGAN, ASSIGNOR OF ONE-SIXTH TO GEORGE W. MARSHALL, ONE-SIXTH TO GEORGE L. MARSHALL, AND ONE-SIXTH TO GAYLORD L. MARSHALL, ALL OF DAYTON, OHIO.

WATER HEATER AND PURIFIER.

Application filed October 31, 1921. Serial No. 511,660.

*To all whom it may concern:*

Be it known that I, HENRY E. MOFFAT, a subject of the King of Great Britain and Ireland, residing at Highland Park, in the county of Wayne and State of Michigan, have invented certain new and useful Improvements in Water Heaters and Purifiers, of which, the following is a specification, reference being had therein to the accompanying drawings.

This invention relates to a combined water heater and purifier and oil separator. The invention consists in the structural features and arrangements of parts hereinafter described and illustrated in the accompanying drawings, wherein:—

Figure 1 is a view of the improved apparatus in sectional elevation;

Figure 2 is a cross sectional view of the same taken on line 2—2 of Figure 1;

Figure 3 is a perspective view of a filtering device employed in the invention.

In these views, 1 designates upper and lower filter beds, formed of excelsior or the like, suspended within a cylindrical casing 2 upon perforated plates 3. Similar perforated plates 4 are superposed on said filter beds to weigh down and hold in place the filter material. A cold water pipe 5 discharges above the upper filter bed, the water being spread upon said bed by a perforated dished reflector plate 5ᵃ. 5ᵇ designate bypasses formed respectively in each filter bed by vertical pipes which afford downward passages for the water in case, through neglect or other cause, the filter beds become completely obstructed by mineral matter or other impurities. Exhaust steam chambers 6, 7 and 8 are formed respectively above, below and between the two filter beds, the lowermost chamber being in connection with a settling chamber 9, occupying the major portion of a cylindrical tank 10, having a larger diameter than the casing 2 and forming a support or base for the latter. Within the casing 2, and spaced from the settling chamber 9 by a vertical partition 11, is a pure water chamber 12. The central portion of said partition is perforated as best seen in Figure 3 and said portion is formed with a door opening 13 normally closed by a sliding perforated door 14. A pair of plates 15 projecting into the chamber 9 from the partition 11 carry adjacent their free ends a plurality of detachable rods 16 upon which is carried a filter member 17 formed of one or more thicknesses of burlap or some similar fabric. The partition 11, end plates 15, and fabric 17 co-act with a bottom plate 18 to form a chamber 19 through which the purified water is required to flow in passing from the settling chamber 9 to the pure water chamber 12. It is to be noted that the bottom plate 18 is positioned some distance above the bottom of the settling chamber and that said plate projects some distance beyond the lower edge of the fabric 17, this being a provision against the clogging of the lower portion of the fabric by the sediment which collects upon the bottom of the settling chamber. An inclined hinged closure 20 controls an opening 20ᵃ in the lower portion of one of the plates 15, said closure normally seating of its own weight and automatically opening in case the hydrostatic pressure in the settling chamber exceeds to a predetermined extent that within the chamber 19. Such an abnormal condition may arise if the fabric 17, due to neglect or other cause, is permitted to become so saturated with impurities as to create a relatively high water level in the settling chamber. The upper portion of the partition 11 is formed with a plurality of openings 19ᵃ for equalizing exhaust steam pressures within the chambers 9 and 12.

In the bottom portion of the tank 10, there is provided an exhaust steam purifying chamber 21 to which exhaust steam is introduced by a pipe 22 leading to the bottom of said tank. Within said chamber 21 there is arranged any suitable means for freeing the steam from any lubricating oil that may have been carried from engines, pumps, or any machinery from which the steam was exhausted. Full description of an oil separating chamber such as the drawing shows may be found in applicant's Patent 1,455,348. 22ᵃ is an exhaust steam pipe providing the main outlet from the steam purifying chamber 21, said pipe rising centrally through the tank 10 and having extensions 22ᵇ and 22ᶜ passing centrally through the filter beds. Said extensions are spaced from each other as indicated at 23 and dome shaped baffles 23ᵃ are arranged in the openings 23 to deflect the exhaust steam laterally into the chambers 7, 8 and 6. In its upward flow from one to another of said chambers, a portion of the exhaust steam will find its way through the filter beds, the remaining portion rising through the extensions 22ª and 22ᵇ. A pipe 24 connecting with the top of the casing 2 carries off the exhaust steam after it has served its purpose of heating the water delivered to said casing. Oil and condensation are taken off from the chamber 21 by way of a pipe 25. A maximum water level within the chambers 9 and 12 is determined by a float 26 acting through a rod 27 to control a valve 28 in the cold water supply pipe 5. There is also provided within the chamber 9 a float 29 acting through an arm 30 and a cord 31 to control an indicator or gage 32 showing the quantity of water accumulated in the tank 10. 33 is a pipe through which the hot purified water is withdrawn from the chamber 12 by a pump 34 which delivers said water through a pipe 35 to laundry or other machines 36. Thus, Figure 1 shows branches 37 controlled by valves 38 leading from said pipe 35 to each of said machines. A relatively small pipe 39 provides for a return flow of water from the pipe 35 to the casing 2, said pipe having branches 40 controlled by valves 41 respectively discharging into the laundry machines 36. 43 is a pipe delivering exhaust steam at low velocity to the laundry machines 36 through branches 44, said pipe being supplied with exhaust steam from the chamber 21 through a pipe 45 rising through the pure water chamber 12 and exercising the function of a heater for the contents of said chamber. 45ª is a drip pipe connecting with the steam pipe 43 beyond the branches 44 and serving to return any condensation to the casing 2. Said pipe has a downward extension 45ᵇ beyond its point of connection with the casing 2 controlled by a valve 45ᶜ, adapting said pipe to be opened to the atmosphere. 46 and 47 are flush pipes respectively extending into the bottom portions of the chambers 9 and 12 and terminating adjacent the wall of said chambers in T heads 46ª and 47ª. 48 and 48ª are blow-off pipes through which the sediment is carried off when said chambers are flushed.

It is preferred to arrange within the central exhaust steam chamber 8, a spreader 49 below the outlets of each of the pipes 39 and 45ª. 50 is a drip pipe for draining any condensation from the steam pipe 43 into the pure water chamber 12. 51 is a check valve automatically opening to break any vacuum that may tend to form within the casing 2, and 52 is a by-pass around the back pressure valve 54 in the pipe 24, providing a constant outlet for any carbonic acid gas that may accumulate in the top portion of the casing.

In the operation of the described construction, it is to be understood that the main portion of the exhaust steam which is purified within the chamber 21 rises through the pipe 22 and flows successively through the steam chambers 7, 8 and 6 finally escaping by way of the pipe 24. The cold water percolates downwardly through the filter beds and is precipitated in a finely divided form successively through the exhaust steam chambers 6, 8 and 7. The contact of the water in such form with the exhaust steam is highly conducive to a transfer of heat units from the steam to the water. Also the filter beds, in addition to removing the impurities from the water, exercise a heating effect thereon. Thus upon reaching the settling chamber 9, the water has been raised to the boiling point, and the presence of the chamber 21 below the tank 10 and of the exhaust steam 22 passing through said tank tend to maintain such a temperature. In passing from the settling chamber to the pure water chamber through the filtering fabrics 17, any remaining impurities are removed from the water. The mounting of the filtering fabrics 17 upon the detachable rods 16 permits a ready removal and replacement of said fabrics when necessary. The provision of water supply connections from the reduced pipe 39 to the laundry machines 36 permits supplying to said machines a relatively small quantity of water under high pressure, and thus affords a regulation not obtainable from the valves 38 which in common practice are under automatic control, and furthermore are arranged in relatively large pipes.

By delivering a portion of the purified exhaust steam from the chamber 21 through the pipe 43 to the laundry machines, the contents of the latter may be heated much more economically than is feasible in the present practice involving the use only of live steam. By arranging a portion 45 of the exhaust steam pipe within the pure water chamber 12, the temperature of the contents of said chamber is kept up so as to insure a proper temperature for the water at the time of its delivery to the pump. The provision of a T-head upon the flush pipes 46 causes the flushing water to have a deflecting discharge against the side walls of the chambers 9 and 12, so as to spread said water completely around and across said chambers so as to exercise an effective cleansing effect.

What I claim as my invention is:—

1. In a device of the character described, the combination with a filter, of a settling chamber receiving the filtered water, a pure water chamber at one side of said settling chamber, an exhaust steam purifying chamber below the settling chamber, and exhaust pipes rising from said purifying chamber respectively through the settling chamber and pure water chamber.

2. In a device of the character described, the combination with a filter, means for delivering impure water to said filter, a settling chamber receiving the filtered water, a steam purifying chamber, a steam pipe rising from said steam purifying chamber through said pure water chamber, and a drip connection from said pipe to the water chamber.

3. In a device of the character described, the combination with a filter, of a settling chamber receiving the filtered water, a pure water chamber at one side of said settling chamber, an exhaust steam purifying chamber below the settling chamber, and an exhaust pipe rising from said purifying chamber through the pure water chamber.

In testimony whereof I affix my signature.

HENRY E. MOFFAT.